United States Patent [19]

Johnson

[11] Patent Number: 4,677,905
[45] Date of Patent: Jul. 7, 1987

[54] FOOD STEAMING APPARATUS

[76] Inventor: Robert A. Johnson, 317 Origen St., Burlington, Wis. 53105

[21] Appl. No.: 812,815

[22] Filed: Dec. 23, 1985

[51] Int. Cl.[4] .............................................. A47J 27/04
[52] U.S. Cl. ........................................ 99/413; 99/450; 126/369
[58] Field of Search ................. 99/410, 413, 415, 418, 99/450; 126/348, 369

[56] References Cited

U.S. PATENT DOCUMENTS

| | | | |
|---|---|---|---|
| 627,330 | 6/1899 | Du Vall | 99/410 |
| 931,070 | 8/1909 | Leetten | 99/410 |
| 987,510 | 3/1911 | Thorne | 99/410 |
| 1,021,133 | 3/1912 | Chaloud | 99/418 |
| 1,189,498 | 7/1916 | Sesler | 99/410 |
| 1,255,014 | 1/1918 | Janiszewski | 99/410 |
| 2,021,465 | 11/1935 | Ritscher | 99/413 X |
| 3,040,651 | 6/1962 | Nolte | 99/450 X |
| 3,357,342 | 12/1967 | Dreyfus | 99/450 |

FOREIGN PATENT DOCUMENTS 73275  9/1916  Switzerland .......................... 99/450

Primary Examiner—Billy J. Wilhite
Attorney, Agent, or Firm—David R. Price

[57] ABSTRACT

A food heating apparatus placeable over boiling water, the apparatus comprising a plate including a generally planar upper surface and a lower surface generally parallel to the upper surface, the plate therethrough a plurality of steam passages extending between the lower surface and the upper surface, each of the steam passages communicating with the upper surface through a first opening having a first area and communicating with the lower surface through a second opening having a second area substantially greater than the first area.

11 Claims, 6 Drawing Figures

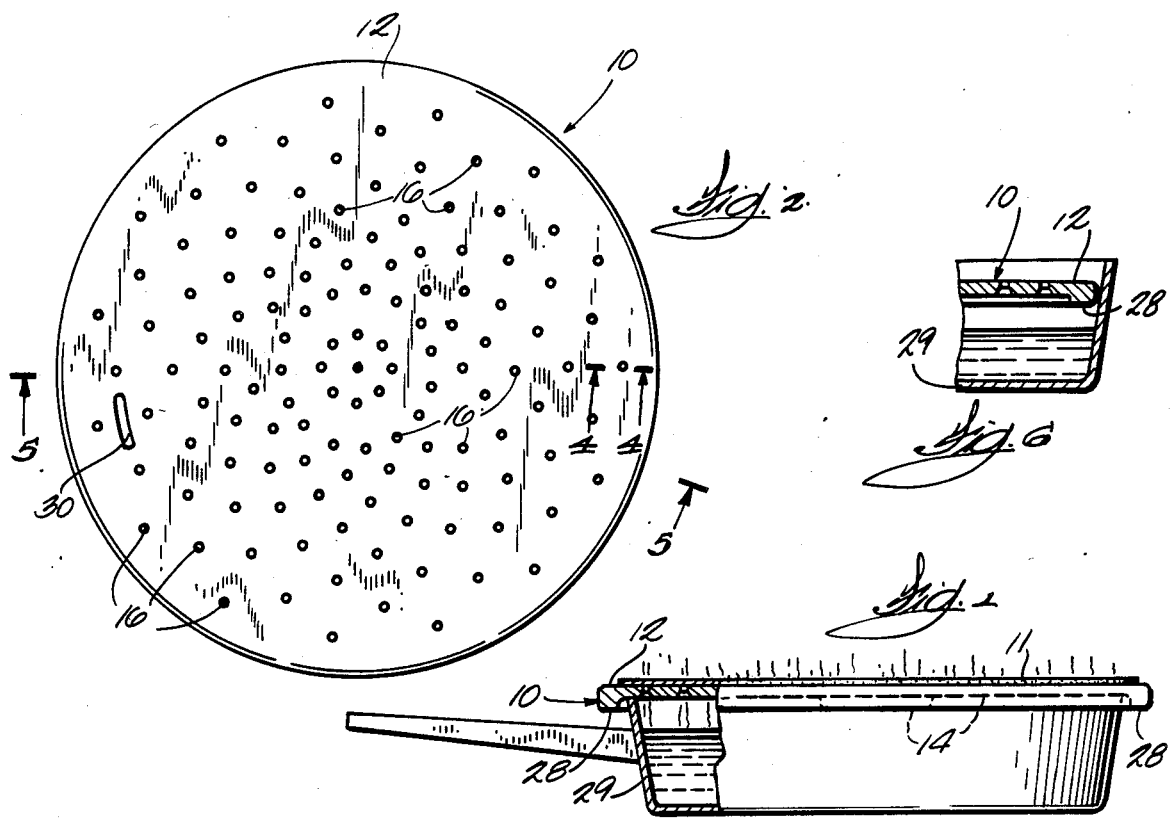
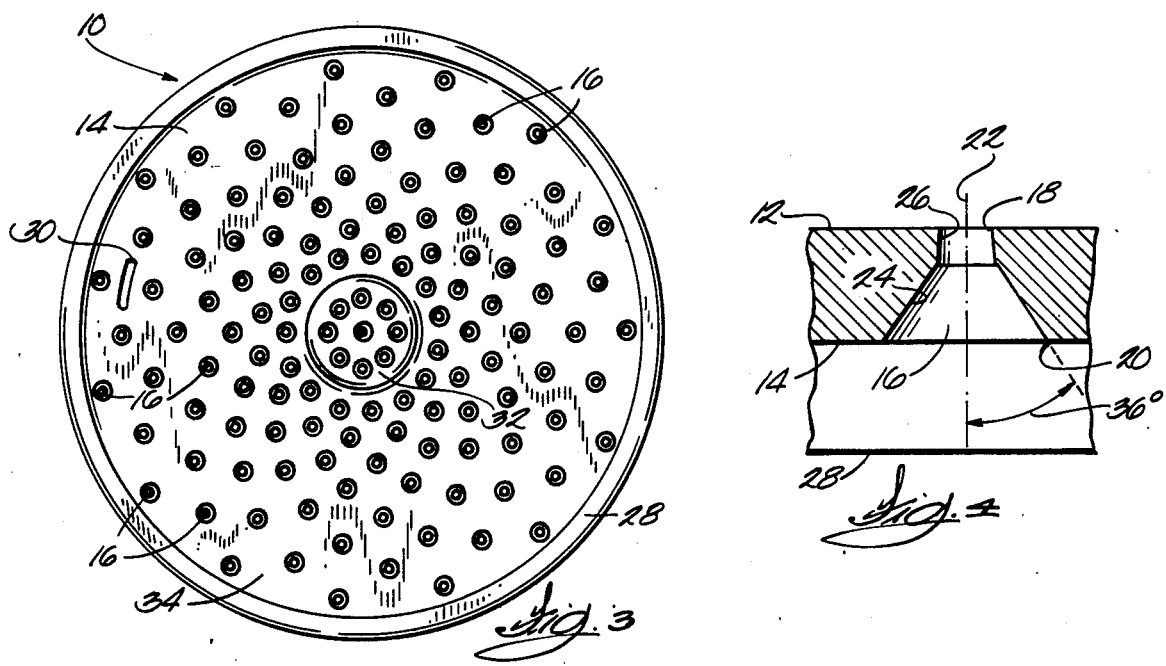
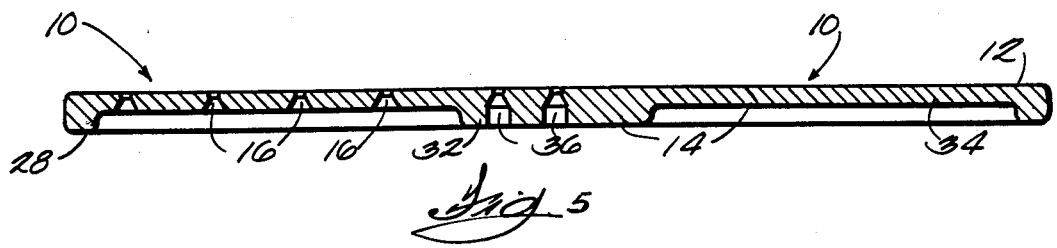

FOOD STEAMING APPARATUS

BACKGROUND OF THE INVENTION

The invention relates to food heating apparatus, and, more particularly, to food steaming apparatus.

It is known to steam food by supporting it over boiling water on a screen which allows steam from the boiling water to pass through to the food. The following patents disclose various apparatus for steaming food in this manner:

| W. Leetten | 931,070 | Aug. 17, 1909 |
| J. Thorne | 987,510 | Mar. 21, 1911 |
| J. A. Sesler | 1,189,498 | July 4, 1916 |
| W. Janiszewski | 1,255,014 | Jan. 29, 1918 |
| W. L. Du Vall | 627,330 | June 20, 1899 |

SUMMARY OF THE INVENTION

The invention provides a food heating apparatus or plate adapted to be placed in or over a pan of boiling water. The apparatus is particularly suited for steaming flat articles of food such as tortillas.

The apparatus has therethrough a plurality of steam passages which allow steam from the boiling water to pass through to food placed on top of the apparatus. To provide optimal heating or steaming, the bottom of each of the steam passages has an area which is substantially greater than the area of the top of each of the steam passages. Furthermore, each of the steam passages preferably includes an upwardly converging, generally frustoconical portion, and a generally cylindrical portion above the frustoconical portion. It has been found that this steam passage construction is most effective.

The apparatus or plate is generally circular and includes a ridge extending downwardly around its circumference for holding the plate on top of a pan. Preferably, the plate has a diameter of approximately 10 inches so that it can be placed inside a 10-inch pan, and the ridge has an inner diameter of greater than 8 inches so that the plate can be placed over the top of an 8-inch pan.

Additionally, the plate includes a central portion which has a thickness substantially greater than the thickness of the adjacent outer portion of the plate. The thicker central portion serves two purposes. First, it rigidifies the plate and prevents bending or warping thereof which might otherwise occur with prolonged use. Second, it acts as a heat sink to prevent overheating of the center of a tortilla or other article of food heated on the plate.

The plate also has therein slot means for facilitating handing of the apparatus with a knife, fork, or similar utensil. For example, a knife can be inserted into the slot in order to lift the plate from the pan.

Other principal features and advantages of the invnetion will become apparent to those skilled in the art upon review of the following detailed description, claims, and drawings.

DESCRIPTION OF THE DRAWINGS

FIG. 1 is a side elevational view, partially in cross-section, of an apparatus which embodies various of the features of the invention and which is seated on top of an 8-inch pan of boiling water.

FIG. 2 is a top view of the apparatus.

FIG. 3 is a bottom view of the apparatus.

FIG. 4 is an enlarged, cross-sectional view taken along line 4—4 in FIG. 2.

FIG. 5 is a cross-sectional view taken along line 5—5 in FIG. 2.

FIG. 6 is a fragmentary side elevational view, partially in cross-section, of the apparatus supported inside a 10-inch pan.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A food heating or steaming apparatus embodying various of the features of the invention is illustrated in the drawings. The apparatus is placeable over boiling water, as shown in FIG. 1, and is particularly suited for steaming flat articles of food such as tortillas.

The apparatus comprises a plate 10 including a generally planar upper surface 12 and a lower surface 14 generally parallel to the upper surface 12. For reasons explained hereinafter, the lower surface 14 of the preferred embodiment is not planar. In FIG. 1, the upper surface 12 is shown supporting a tortilla 11. While the plate 10 can be made of any suitable material, in the preferred embodiment, it is made of aluminum. In the preferred embodiment, the plate 10 is generally circular and has a diameter of approximately 9.875 inches, a circumference and a center.

The plate 10 has therethrough a plurality of steam passages 16 extending between the lower surface 14 and the upper surface 12. In the preferred embodiment, the steam passages 16 are arranged in a plurality of circles concentric about the center of the plate 10.

In the preferred embodiment, each of the steam passages 16 communicates with the upper surface 12 through a first opening 18 having a first area and communicates with the lower surface 14 through a second opening 20 having a second area substantially greater than the first area. In other words, the bottom of each of the steam passages 16 has an area substantially greater than the area of the top of each of the steam passages 16. Preferably, the second area is approximately ten times the first area. More particularly, in the preferred embodiment, the steam passages 16 have a circular cross-section, and the first openings 18 have a diameter of 0.090 inches and an area of approximately 0.006 square inches, and the second openings have a diameter of approximately 0.281 inches and an area of 0.06 square inches.

In the preferred embodiment, each of the steam passages 16 has a longitudinal axis 22 extending from the lower surface 14 to the upper surface 12, and a portion 24 converging upwardly or in the direction toward the upper surface 12 at an angle of approximately 36 degrees relative to the longitudinal axis. This is best shown in FIG. 4. Furthermore, in the preferred embodiment, each of the steam passages 16 has a generally straight portion 26 communicating between the converging portion 24 and the upper surface 12. Actually, in the illustrated construction, the straight portion 26 converges upwardly at an angle of approximately 5 degrees relative to the longitudinal axis 22. In the preferred embodiment, the converging portion 24 is generally frustoconical, and the straight portion 26 is generally cylindrical. Additionally, in the preferred embodiment, the straight portion 26 has a length equal to approximately one half of the length of the converging portion 24. More particularly, in the preferred embodiment, the straight portion 26 has a length of 0.06 inches, and the converging portion 24 has a length of 0.12 inches.

It should be understood that, in alternative embodiments, the steam passages 16 can have other configurations. For example, the converging portion 24 can converge at an angle of other than 36° and the steam passages 16 can have other cross-sectional shapes. However, it has been found that the illustrated configuration provides optimal steaming performance.

In the preferred embodiment, the plate 10 further includes means extending downwardly from the lower surface 14 around the circumference for retaining the plate 10 on top of a pan 29 (see FIG. 1). While various suitable retaining means can be employed, in the preferred embodiment, the retaining means includes a continuous ridge 28 extending downwardly from the lower surface 14. When the plate 10 is placed over the top of the pan 29, the retaining means or ridge 28 prevents the plate 10 from sliding off the pan 29. In the preferred embodiment, the ridge 28 has an inner diameter of greater than 8 inches. Accordingly, the plate 10 can be either placed inside a 10-inch pan as shown in FIG. 6 or placed on top of an 8-inch pan as shown in FIG. 1. When the plate 10 is placed inside a 10-inch pan, it is supported by the sloped wall of the pan 29 so as to be spaced above the bottom of the pan 29, thereby leaving room for water beneath the plate 10.

In the illustrated construction, the plate 10 has therein slot means 30 for facilitating handling of the plate 10. The plate 10 can be lifted by placing a knife, fork, or similar utensil in the slot 30.

Preferably, the plate 10 includes a central portion 32 having a first width or diameter and a first thickness between the upper and lower surfaces, and an adjacent outer portion 34 having a second width or diameter greater than the first width and a second thickness between the upper and lower surfaces substantially less than the first thickness. It is because of these different thicknesses that the lower surface 14 is not planar. Instead, the portion of the lower surface 14 on the central portion 32 is offset from the portion of the lower surface 14 on the outer portion 34. In the illustrated construction, the central portion 32 is circular and has a diameter approximately equal to 0.20 times the diameter of the plate 10, or approximately equal to two inches. Furthermore, in the illustrated construction, the first thickness is approximately equal to 0.36 inches, and the second thickness is approximately equal to 0.18 inches. Thus, the second thickness is approximately one half of the first thickness.

It should be noted that, in the outer portion 34, the converging portions 24 of the steam passages 16 communicate directly with the lower surface 14. In the central portion 32, each of the steam passages 16 has a lower, straight or cylindrical portion 36 communicating between the converging portion 24 and the lower surface 14. This is due to the increased thickness of the central portion 32.

Various features of the invention are set forth in the following claims.

I claim:

1. A food heating apparatus placeable over the open top of a container of boiling water, said apparatus comprising a plate including a generally planar upper surface, a lower surface generally parallel to said upper surface, a central portion having a first width and a first thickness between said upper and lower surfaces, and an adjacent outer portion having a second width greater than said first width and a second thickness between said upper and lower surfaces substantially less than said first thickness, said plate having therethrough a plurality of steam passages extending between said lower surface and said upper surface.

2. An apparatus as set forth in claim 1 wherein each of said steam passages communicates with said upper surface through a first opening having a first area and communicates with said lower surface through a second opening having a second area substantially greater than said first area.

3. An apparatus as set forth in claim 2 wherein said second area is approximately ten times said first area.

4. An apparatus as set forth in claim 2 wherein each of said steam passages has a longitudinal axis extending from said lower surface to said upper surface, and a portion converging in the direction toward said upper surface at an angle of approximately 36° relative to said longitudinal axis.

5. An apparatus as set forth in claim 4 wherein each of said steam passages further has a generally straight portion communicating between said converging portion and said upper surface.

6. An apparatus as set forth in claim 5 wherein said converging portion has a length, and wherein said straight portion has a length equal to approximately one half of said length of said converging portion.

7. An apparatus as set forth in claim 5 wherein said converging portion is generally frustoconical, and wherein said straight portion is generally cylindrical.

8. An apparatus as set forth in claim 1 wherein said plate has a center, and wherein said steam passages are arranged in a plurality of circles concentric about said center.

9. An apparatus as set forth in claim 1 wherein said plate is generally circular and has a circumference, and wherein said plate further includes means extending downwardly from said lower surface around said circumference for retaining said plate on top of a pan.

10. An apparatus as set forth in claim 1 wherein said plate has therein slot means for facilitating handling of said apparatus.

11. A food heating apparatus placeable over the open top of a container of boiling water, said apparatus comprising a generally circular plate having a circumference and a center, said plate including a generally planar upper surface, a lower surface generally parallel to said upper surface, a ridge extending downwardly from said lower surface around said circumference, a central portion having a first width and a first thickness between said upper and lower surfaces, and an adjacent outer portion having a second width greater than said first width and a second thickness between said upper and lower surfaces substantially less than said first thickness, said plate having therein slot means for facilitating handling of said apparatus, and said plate having therethrough a plurality of steam passages extending between said lower surface and said upper surface, said steam passages being arranged in a plurality of circles concentric about said center, each of said steam passages communicating with said upper surface through a first opening having a first area and communicating with said lower surface through a second opening having a second area approximately ten times said first area, and each of said steam passages having a longitudinal axis extending from said lower surface to said upper surface, a generally frustoconical portion communicating with said lower surface and converging in the direction toward said upper surface at an angle of approximately 36° relative to said longitudinal axis, and generally cylindrical portion communicating between said frustoconical portion and said upper surface.

* * * * *